United States Patent [19]

Gebelius

[11] Patent Number: 4,531,856
[45] Date of Patent: Jul. 30, 1985

[54] METHOD TO JOIN TWO ELEMENTS, AND A JOINT ACCORDING TO THE METHOD

[76] Inventor: Sven R. V. Gebelius, Drottningholmsvägen 195, Bromma, Sweden, S-161 36

[21] Appl. No.: 388,511
[22] PCT Filed: Nov. 4, 1981
[86] PCT No.: PCT/SE81/00324
  § 371 Date: Jun. 15, 1982
  § 102(e) Date: Jun. 15, 1982
[87] PCT Pub. No.: WO82/01488
  PCT Pub. Date: May 13, 1982

[30] Foreign Application Priority Data
  Nov. 4, 1980 [SE] Sweden .................................. 8007741
  Nov. 4, 1980 [SE] Sweden .................................. 8007742
  Aug. 20, 1981 [SE] Sweden .................................. 8104947

[51] Int. Cl.³ .............................................. F16D 1/06
[52] U.S. Cl. ....................................... 403/366; 403/5; 29/421 E
[58] Field of Search ................... 403/5, 365, 366, 367; 285/382; 29/421 E

[56] References Cited

U.S. PATENT DOCUMENTS
  3,572,768  3/1971  James .
  3,626,506  12/1971 Spietz ................................ 403/5 X

FOREIGN PATENT DOCUMENTS
  1917348  11/1977 Fed. Rep. of Germany .
  1468370  3/1977  United Kingdom .

Primary Examiner—Andrew V. Kundrat
Attorney, Agent, or Firm—Holman & Stern

[57] ABSTRACT

A joint for two elements wherein one element has an internal peripheral surface disposed in surrounding spaced relationship with respect to the external peripheral surface of the second element, comprising a ring-shaped expandable tubular member disposed between the internal and external peripheral surfaces of the elements to be joined, and having an explosive charge enclosed therein to expand the tubular member when ignited into contacting engagement with the internal and external peripheral surfaces, and holding and sealing members disposed between the internal and external peripheral surfaces to be forced into engagement with the internal and external peripheral surfaces by expansion of the tubular expandable member to increase the holding and sealing properties of the finished joint.

7 Claims, 24 Drawing Figures

METHOD TO JOIN TWO ELEMENTS, AND A JOINT ACCORDING TO THE METHOD

CROSS REFERENCE TO RELATED APPLICATION

The invention of this application is disclosed in corresponding International Application No. PCT/SE81/00324 filed Nov. 4, 1981, the benefit of which is being claimed.

BACKGROUND OF THE INVENTION

1. Field of the Invention

The present invention relates to a method to join two elements, and a joint made according to the method.

2. Description of the Prior Art

For numerous applications, it is desired to join two elements, one of the elements being located surrounding the second element. Such a joint can be used for attachment purposes, or to join together two elements, in the latter case either by the use of a separate surrounding member, e.g. a tubular member located surrounding the end portions of two pipes, or two members, one having a larger internal diameter than the outside diameter of a second member, the first member arranged surrounding the second member. A joint can be accomplished by means of welding, provided that the distance between the adjacently located surfaces of the elements is rather small. However, since welding is a rather time-consuming method to accomplish a joint, and since welding also requires skilled personnel, other methods to accomplish a joint have been proposed. With regard to the method and the joint according to the present invention, the most relevant prior art is disclosed in Norwegian Patent Specification Nos. 136.223 and 141.128, which disclose a joint accomplished by the use of one, or a number of explosive charges, arranged to cause expansion of a surrounding tubular member, thereby forming a frictional joint between two elements. However, the prior art as disclosed in the above two patents only facilitates accomplishment of a joint in a minimum of time, but the joint lacks certain desired features, since it requires that one of the elements is specifically arranged to hold the expandable tubular joint, and since it only accomplishes a joint of frictional type, without any sealing elements.

BRIEF SUMMARY OF THE INVENTION

The object of the present invention is to disclose an improved method and joint, which removes all disadvantages with previously known types of explosive joints, and which makes it possible to accomplish a joint having desired holding and sealing properties, and without any need for one of the elements being prepared in a certain fashion to hold the expandable element. The present invention makes it thus possible to accomplish a joint having improved holding and sealing properties in relation to the prior art, and said properties can be altered in any desired fashion. Furthermore, none of the elements to be joined need to be pre-machined to facilitate use of the joint according to the present invention. However, for certain applications, it may be regarded as advantageous to arrange a groove in at least one of the peripheral surfaces facing each other at the elements to be joined. A major advantage is that the joint can be established between two elements having large diametrical tolerances, and that there is a minimum requirement for surface finish with regard to the surfaces to be joined. Furthermore, the joint according to the present invention can also be arranged including an element which prevents deflection of the joint from a contact position against the facing surfaces of the elements joined. Sealing and holding properties can be varied as desired, by reducing or increasing the number of sealing elements included in the joint, and by increasing or decreasing the total area of contact established between the elements by means of the joint.

The method to join two elements according to the present invention is mainly characterized in that a mainly ring-shaped tubular member is arranged with longitudinally extending depressions, thereby reducing the internal and external diameter of same, is located between two elements to be joined, one of said elements having an internal surface facing and located at a distance from the external surface of a second element, said tubular member surrounding an explosive charge and an associated igniter means, said explosive charge being arranged to expand the tubular member when ignited, thereby forcing it into a contact position with the facing surfaces of the two elements, thus establishing a joint between same. The expansion of the tubular member is preferably also arranged to force at least one sealing member, located adjacent to the expandable tubular member, into a contact position with the elements to be joined. The explosive force can also be arranged to influence as a first step a member located embraced by the expandable tubular member, arranged to take up contact with the internal surface of the tubular member, and to prevent deflection from an expanded position in contact with the elements to be joined. Further characteristic features of the method according to the present invention, and of a joint according to the method, are disclosed in the claims.

A number of embodiments of joints according to the present invention will now be more fully described, reference being made to the accompanying drawings wherein.

DETAILED DESCRIPTION

The method according to the present invention is based on the use of an expandable tubular member, which can be expanded by means of an explosive charge, located within said member.

Figure 1:
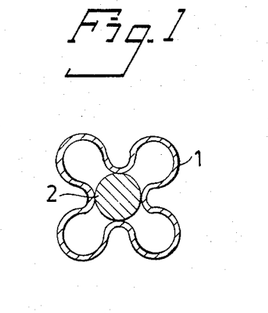
FIG. 1 is a cross-sectional view of a first embodiment of an expandable tubular member, shown before exapansion.
Figure 2:
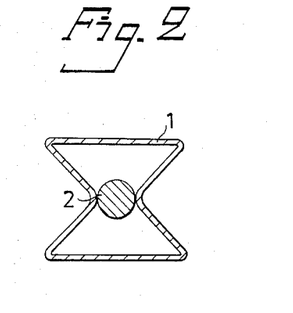
FIG. 2 is a cross-sectional view corresponding to FIG. 1, showing a second embodiment of a tubular member.
Figure 3:
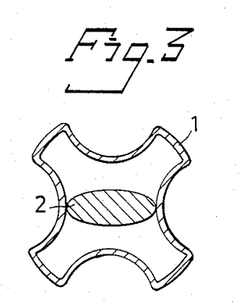
FIG. 3 is a cross-sectional view corresponding to FIGS. 1 and 2, showing a third embodiment of an expandable tubular member.

With reference to the embodiment shown in FIG. 1, the expandable tubular member has been denominated with reference numeral 1, and it encloses an explosive charge 2, which can be detonated by means of an igniter (not shown), e.g. a mechanically or electrically operated igniter. In order to facilitate expansion, and to reduce the external diameter and increase the internal diameter before expansion, said tubular member 1 has four longitudinally extending deformations, directed towards the center of the tubular member 1. The number of longitudinally extending deformed portions may be varied in a number of ways, and two further examples are shown in FIGS. 2 and 3. However, it is obviously possible to vary the shape and the number of deformations in many other ways, since the outside diameter can be decreased, and the internal diameter can be increased, using any other number or shape of deformations. For a large number of applications, the tubular member 1 should not only expand diametrically, but also in width. Accordingly, deformations directed towards each other from at least three different planes are normally preferred.

Figure 4:
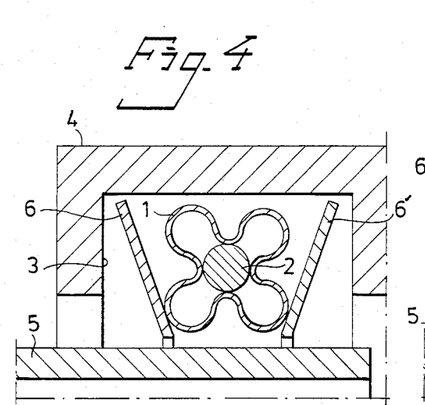
FIG. 4 is a cross-sectional view of the embodiment shown in FIG. 1, arranged with two adjacently located sealing and holding members and arranged in an intermediately located position between two elements, shown before expansion into a position joining the elements together.

FIG. 4 shows the tubular member 1 disclosed in FIG. 1, located in a peripheral groove 3 taken up in the internal wall surface of a first tubular element 4, located surrounding and at a distance from the external wall surface of a second tubular element 5. A spring ring 6, 6', having a frusto-conical cross-section, is located at each side of the expandable tubular member 1, located in an intermediate position between the side surfaces of the groove 3 and the tubular member 1.

Figure 5:
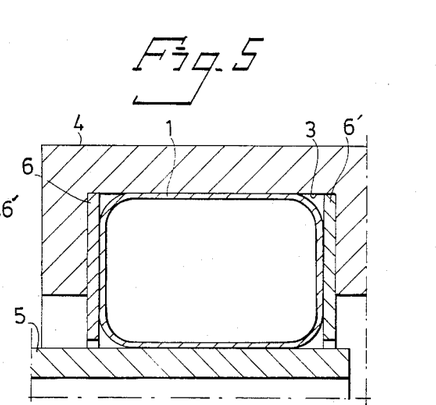
FIG. 5 is a cross-sectional view of the embodiment shown in FIG. 4, when a joint has been established between the elements.

When the explosive charge 2 is detonated, the tubular member 1 is expanded diametrically into a contact position with the bottom surface of the groove and the external surface of the second element 5, and it is also expanded towards the side wall surfaces of the groove 3, thereby flattening the frusto-conical spring rings 6, 6' against the side wall surfaces of the groove 3. The external diameter of each spring ring 6, 6' is thus expanded, and the internal diameter is reduced, whereby the spring rings 6, 6' are forced into contact against the bottom surface of the groove 3 and the external peripheral surface of the second element 5. Each spring ring 6, 6' is thus acting as a sealing and holding element in conjunction with the expanded tubular member 1, and since the expanded tubular member 1 mainly takes up a frictional contact between the two elements 4, 5, the sealing and holding properties are considerably improved by the mechanical contact taken up by means of the outside and inside edge portions of the spring rings 6, 6', which in fact slightly cut into the bottom surface of the groove and the outside wall surface of the second element 5. This final joined position is shown in FIG. 5.

Figure 6:
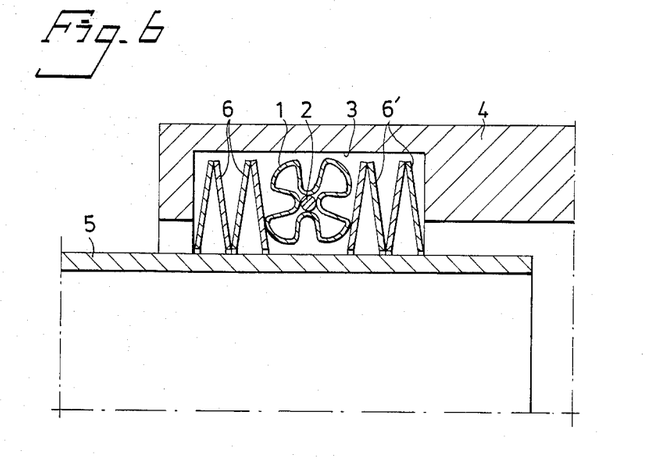
FIG. 6 is a cross-sectional view corresponding to FIG. 4, showing a number of sealing and holding members located adjacently to each side of the expandable tubular member.

The number of spring rings 6, 6' at each side of the expandable tubular member 1 may be further increased, as shown in FIG. 6. According to this embodiment, four spring rings 6, 6' are shown located at each side of the tubular member 1, each individual spring ring 6, 6' being turned 180° in relation to adjacently located spring rings 6, 6'. This embodiment illustrates how the number of spring rings 6, 6' can be varied as desired, in order to increase sealing and holding properties of the established joint. The shown embodiment may be further modified, since more than one expandable tubular member 1 may be used, spaced from each other by means of intermediately located spring rings 6, 6'. Such a modification would increase the area of frictional contact, and also facilitate the use of a larger number of spring rings 6, 6', i.e. a larger number of sealing and holding elements.

Figure 7:
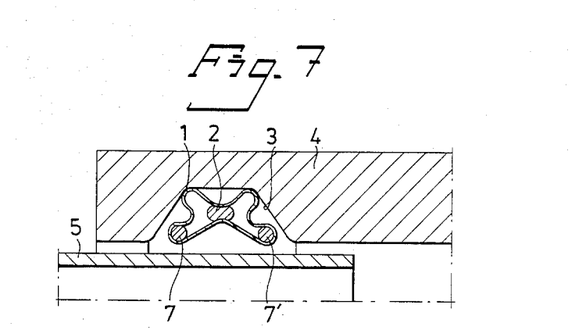
FIG. 7 is a cross-sectional view of a further embodiment of a joint according to the present invention, shown before the establishment of an expanded position, joining two elements together.
Figure 8:
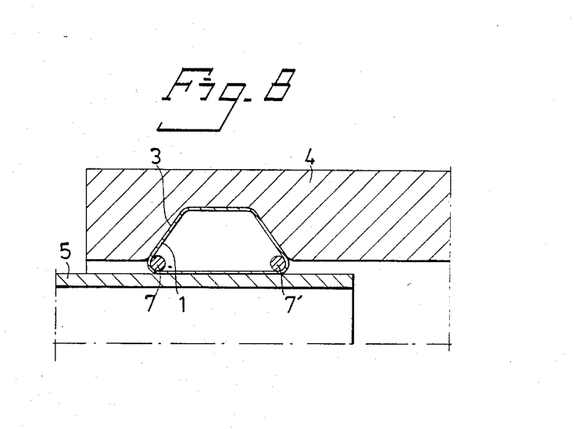
FIG. 8 is a cross-sectional view corresponding to FIG. 7, showing the established joint.

A further embodiment of a joint according to the present invention is shown in FIGS. 7 and 8. The expandable tubular member 1 in this embodiment is arranged with two supporting ring members 7, 7', arranged spaced from each other and enclosed within the tubular member 1. The groove 3 for the expandable tubular member 1 has a trapezoidal cross-section, thereby increasing the contact surface against the second element 5. When the explosive charge 2, located within the expandable tubular member 1, is detonated, the tubular member 1 is expanded into the position shown in FIG. 8, thereby forming a joint between the elements 4, 5. The ring members 7, 7' now prevent the tubular member 1 from being deflected away from the second element 5. Obviously, other cross-sectional configurations can be used than the trapezoidal cross-section shown, in order to facilitate use of sealing and holding members located adjacent to the expandable tubular member 1, e.g. as disclosed with reference to the embodiments shown in FIGS. 4–6.

Figure 9:
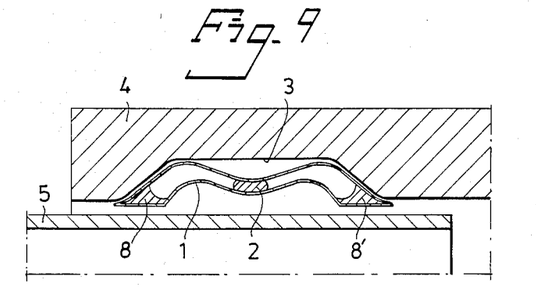
FIG. 9 is a cross-sectional view of an embodiment having integrated sealing members, shown in an intermediate position between two elements before expansion into a position joining the elements together.
Figure 10:
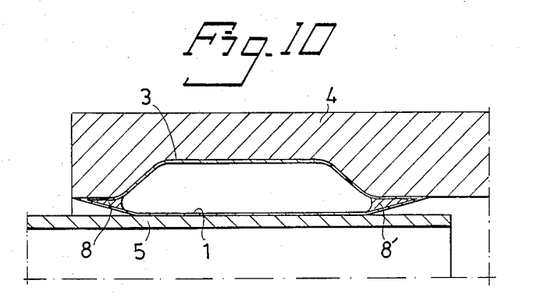
FIG. 10 is a cross-sectional view corresponding to FIG. 9, showing the established joint.

The expandable tubular member 1 may also be arranged with integrated and outwardly directed sealing members, and an example of this is shown in FIGS. 9 and 10. The expandable tubular member 1 includes two mainly wedge-shaped sealing members 8, 8', extending outwardly in a direction away from each other and in a mainly parallel relationship to the external surface of the second element 5. The term "wedge-shaped" refers to the cross-sectional configuration of said members 8, 8', since they extend along the entire length of the expandable tubular member 1. When the explosive charge 2 is detonated, the tubular member 1 is expanded, and the wedge-shaped sealing members 8, 8' move in a direction away from each other, thereby establishing contact with the elements 4, 5 to be joined. This final position is shown in FIG. 10.

Figure 11:
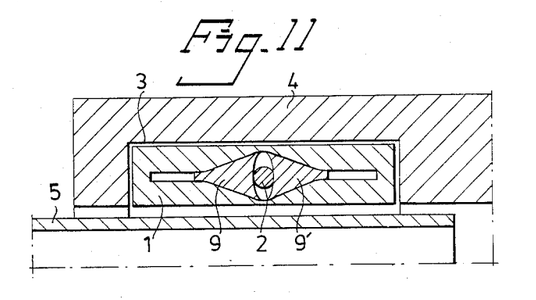
FIG. 11 is a cross-sectional view of a further embodiment having two wedge-acting ring members enclosed within the expandable tubular member, shown before the establishment of a joint between two elements.
Figure 12:
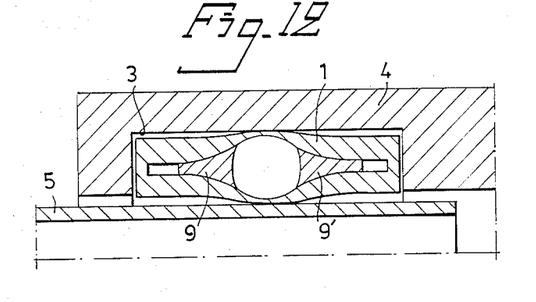
FIG. 12 is a view corresponding to FIG. 11, showing the established joint.

A further modified embodiment is shown in FIGS. 11 and 12, having two wedge-acting ring members 9, 9' enclosed within the expandable tubular member 1, the explosive charge 2 being located in an intermediate position between said ring members 9, 9'. Before the explosive charge 2 is detonated, the ring members 9, 9' are located adjacently to each other, as shown in FIG. 11. The explosive force from said charge 2 moves the wedge-acting ring members 9, 9' in a direction away from each other, thereby expanding the tubular member 1 into a contact position against the elements 4, 5, and said ring members 9, 9' prevent the tubular member 1 from being deflected away from the surfaces contacted at the elements 4, 5. Accordingly, a frictional joint is established between the elements 4, 5, and since the wedge-acting ring members 9, 9' are completely enclosed with the tubular member 1, there is no mechanical damage on either of the elements 4, 5 to be joined by means of the ring members 9, 9', when they move away from each other.

Figure 13:
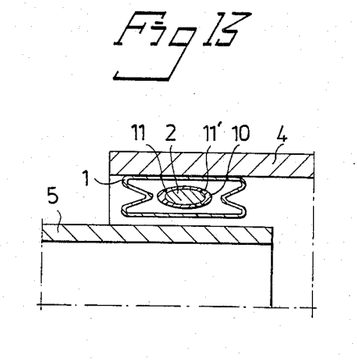
FIG. 13 is a cross-sectional view of the embodiment shown in FIG. 2, shown before expansion and including a tubular member, arranged to be expanded into a contact position with the internal wall surface of the outer tubular member, shown before expansion.
Figure 14:
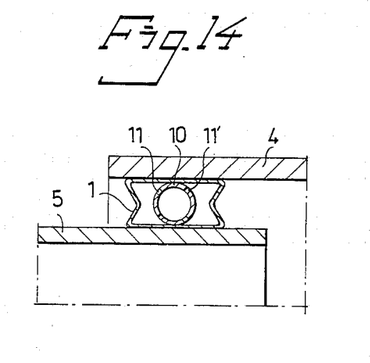
FIG. 14 is a cross-sectional view of the embodiment shown in FIG. 13, showing the established joint.

In order to prevent deflection of the tubular member 1 when expanded into a contact position with the elements 4, 5 to be joined, a further modification is shown in FIG. 13. This embodiment corresponds mainly with the embodiment shown in FIG. 2, but includes a second expandable tubular member 10 located within the first expandable tubular member 1. Said second tubular member 10 is arranged with a number of holes or apertures 11, 11', spaced from each other, and the explosive charge is located within said second tubular member 10. When the explosive charge 2 is detonated, the explosive force expands the second member 10, and the combustion gases are also distributed through existing holes or apertures 11, 11' in said member 10 into the first expandable member 1, which is expanded into a contact position with the elements 4, 5 to be joined. As shown in FIG. 14, the second tubular member 10 now acts a reinforcing tubular member within the first member 1 in contact with the elements 4, 5, thereby preventing its deflection from the contact position with the elements 4, 5. Obviously, this embodiment can also be combined with adjacently located sealing and holding members, as disclosed with reference to FIGS. 4–6.

Figure 15:
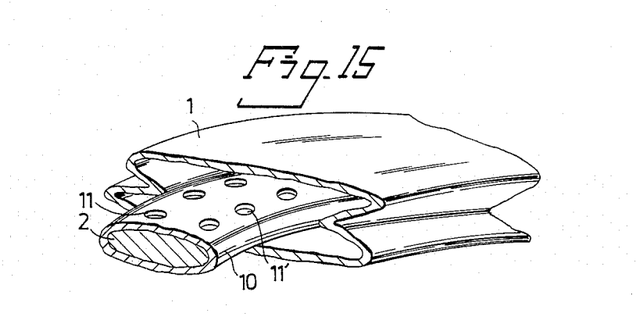
FIG. 15 is a perspective view of a portion of the expandable tubular members shown in FIG. 13.

The first and second expandable tubular member, 1 and 10 respectively, are shown more in detail in FIG. 15, in which portions of these members are shown as a perspective view, the inside expandable tubular member 10 being shown extending out from the outside tubular member 1.

Figure 16:
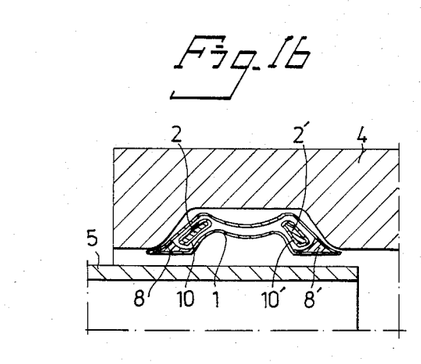
FIG. 16 is a cross-sectional view of the embodiment shown in FIG. 9, enclosing two expandable tubular members, shown before expansion.
Figure 17:
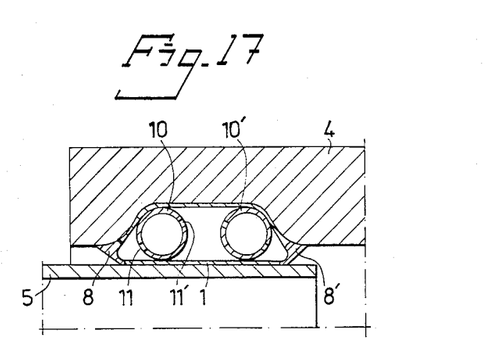
FIG. 17 is a cross-sectional view of the embodiment shown in FIG. 16, showing the established joint.

The number of inside tubular members 10, located within the first tubular member 1, may also be larger than one, as shown in FIG. 16. This embodiment corresponds to the embodiment disclosed with reference to FIG. 9, but in order to remove the risk for deflection from an expanded position, two expandable tubular members, denominated 10 and 10' respectively, are located within the first expandable tubular member 1, each one enclosing an explosive charge, 2 and 2' respectively. When the explosive charges 2, 2' are detonated, the enclosed tubular members 10, 10' are expanded within the outer tubular member 1, and since the combustion gases from the explosion pass through the holes or apertures 11, 11' taken up in each internal tubular member 10, 10', the outer tubular member 1 is also expanded into a contact position against the elements 4, 5 to be joined. This final position is shown in FIG. 17, and the expanded tubular members 10, 10' now act as two reinforcement means within the outer expanded tubular member 1, thus preventing deflection of said outer member 1 from the contact position taken up against the elements 4, 5.

Figure 18:
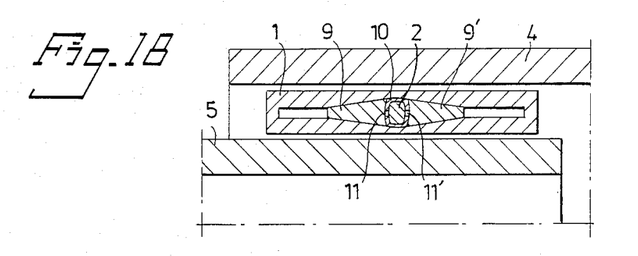
FIG. 18 is a cross-sectional view of the embodiment shown in FIG. 11, including an expandable tubular member located in an intermediate position to the wedge-acting ring members.
Figure 19:
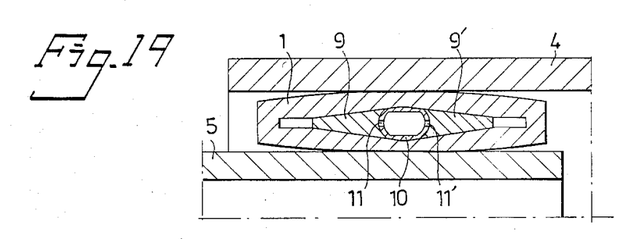
FIG. 19 is a cross-sectional view of the embodiment shown in FIG. 18, showing the established joint.

The embodiment previously discussed with reference to FIG. 11 can also be modified by means of an internal expandable tubular member 10, as shown in FIG. 18. Said member 10 is located in an intermediate position between the wedge-acting rings 9, 9', enclosing the explosive charge 2. When said charge is detonated, the tubular member 10 enclosing the charge 2 is expanded, simultaneously as the wedge-acting rings 9, 9' move in direction away from each other. When the joint has been established, as shown in FIG. 19, the expanded tubular member 10 acts as a means preventing the wedge-acting rings 9, 9' from moving back towards each other. The joint established is thus more secure than the joint shown in FIG. 12, which is obvious when compared with the established joint shown in FIG. 19.

The joint according to the present invention can be manufactured with the expandable tubular member 1 having a ring-shaped configuration, e.g. from a tubular member formed into a preferably mainly circular configuration, and with adjacent end portions being joined together by means of welding or any other previously known method. However, in order to facilitate adjustment to the diameter of the members 4, 5 to be joined, and to avoid the risk for cracks or other damage in the joint at the portion where the tubular member 1 has been joined, it is also possible to accomplish a mainly ring-shaped member without the above disadvantages.

Figure 20:
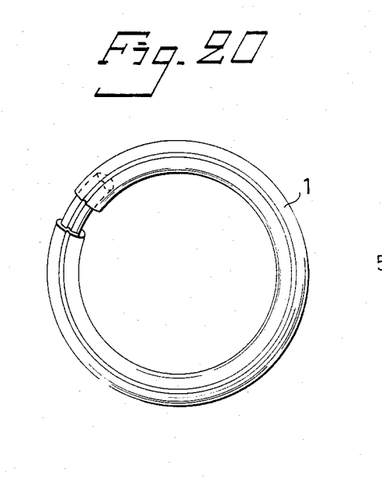
FIG. 20 is a side elevational view of a telescopically interconnected portion of an expandable tubular and mainly ring-shaped member.

As shown in FIG. 20, the free end portions of the tubular member 1 can also be telescopically interconnected, i.e. one end portion being arranged having an internal configuration mainly corresponding to the outside configuration of the other end portion. When the enclosed explosive charge 2 is detonated, the tubular member 1 is expanded both diametrically and longitudinally, and the internal force from the combustion gases also expand the enclosed tubular end portion into contact with the surrounding tubular end portion.

Figure 21:
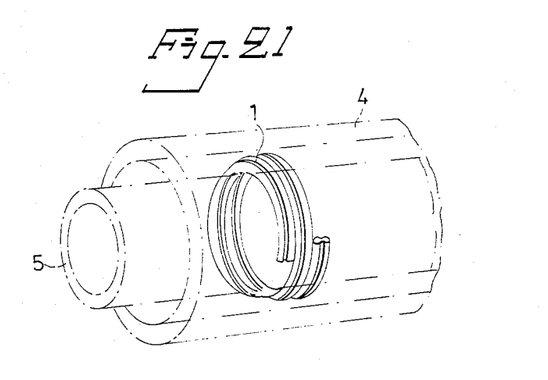
FIG. 21 is a perspective view of a helically wound expandable tubular member according to the present invention.

The expandable tubular member 1 has been referred to as a mainly ring-shaped member, but this term is also intended to include a helically wound tubular member 1, as shown in FIG. 21. According to the present invention, it is possible to use either separate ring-shaped tubular members 1, arranged as single elements, or as a combination of rings, adjacently located to each other. A helically wound tubular member 1 can be regarded as a number of mainly ring-shaped members, each turn forming one such member.

To use a helically wound tubular member 1 can be regarded as advantageous for certain applications, and it also facilitates the use of members 1 which are formed to desired diameter from a longitudinally extending length. The end portions are sealed, e.g. folded over, and the igniter for the explosive charge 2 is preferably inserted immediately prior to this sealing operation. The total length of the joint is easily predetermined, since any desired number of adjacently located turns can be applied.

Furthermore, the tubular member 1 may also include at least one enclosed second expandable tubular member 10, having through holes or apertures 11, 11' and surrounding the explosive charge 2. The enclosed second tubular member 10 will thus act as a reinforcing member, preventing deflection of the outer tubular member 1 from an expanded position in contact with the elements 4, 5 to be joined, as previously discussed with reference to the embodiments shown in FIGS. 13–19.

Figure 22:
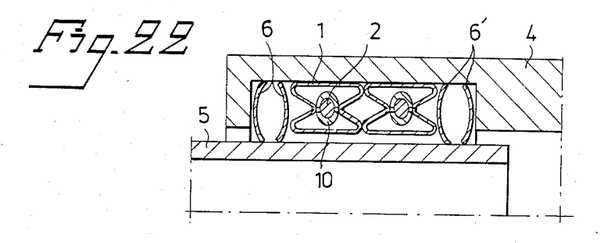
FIG. 22 is a cross-sectional view of the embodiment shown in FIG. 21, arranged to form a joint between two elements, having a number of sealing and holding elements arranged adjacent to the outer end portions of the helically wound tubular member.
Figure 23:
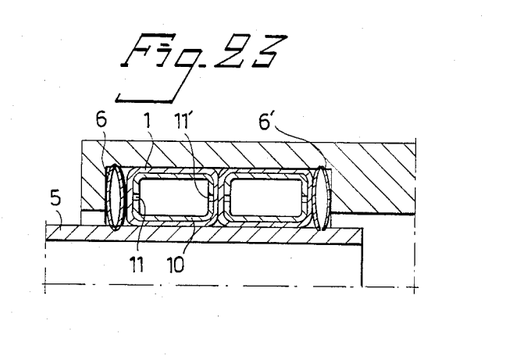
FIG. 23 is a cross-sectional view corresponding to FIG. 22, the outer expanded tubular member being arranged surrounding an internal tubular member.

A helically wound tubular member 1 may also be used together with a number of adjacently located sealing and holding members, as disclosed with reference to FIGS. 4–6. This is shown in FIG. 22, which shows a helically wound tubular member 1, having a supporting tubular member 10 enclosing the explosive charge 2 located inside the outer tubular member 1. When the explosive charge 2 is detonated, the joint is established between the elements 4, 5, as shown in FIG. 23.

Figure 24:
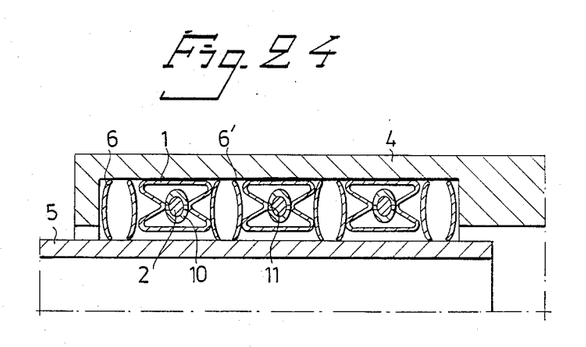
FIG. 24 is a cross-sectional view, showing how a number of expandable tubular members can be arranged, having intermediately located sealing and holding members.

As previously mentioned, a number of ring-shaped tubular members 1 can be used for the establishment of one joint, and FIG. 24 shows how three tubular members 1 are arranged with spring rings 6, 6' located in an intermediate position, and also located adjacent to the outside surfaces of each tubular member 1. When the explosive charges are brought to detonate, by actuating associated igniting means, the expansion of the tubular members 1 will obviously force the spring rings 6, 6' to take up contact with the elements 4, 5, thus acting as sealing and holding members, improving the holding properties of the established joint.

The above described embodiments, shown in the accompanying drawings, are only intended to serve as examples of embodiments within the scope of the present invention and following claims. As shown, a large number of embodiments can be combined in different ways, depending on the requirements of the joint to be established, i.e. strength, sealing, and other properties. The risk of deflection from an expanded contact position can be eliminated by the use of enclosed expandable tubular members 10, 10', and sealing and holding properties can be improved as desired by the use of external sealing and holding members, either being integrated with the outer expandable tubular member 1, or being applied as separate members 6, 6'.

The explosive charge 2 can be ignited mechanically or electrically, and the igniters are of previously known type. Since the igniter can be initiated in so many different fashions, only the explosive charge 2 has been shown, but electrical wires, or a mechanical striking pin, can obviously be arranged extending out from the expandable tubular member 1.

Accordingly, the present invention is in no way restricted to only the embodiments shown and described, since many modifications obviously are possible within the scope of the invention and the following claims.

Finally, the spring rings 6, 6' may also be arranged with a curved cross-sectional configuration, or any other suitable configuration, facilitating expansion when compressed.

I claim:

1. A joint for two elements wherein one element to be joined has an internal peripheral surface disposed in surrounding spaced relationship with respect to the external peripheral surface of the second element, comprising:
   at least one substantially ring-shaped expandable tubular member disposed between the internal and external peripheral surfaces of the respective elements to be joined;
   an explosive charge enclosed within said tubular member to expand said tubular member when ignited into contacting engagement with said internal and external peripheral surface;
   igniter means operatively associated with said explosive charge to ignite said explosive charge;
   at least one restricting surface in the space between said internal and external peripheral surfaces to restrict expansion of said tubular member; and
   at least one holding and sealing member disposed between said internal and external peripheral surfaces and between an external side surface of said tubular member and said at least one restricting surface comprising at least one spring ring having a substantially frusto-conical cross-sectional configuration, so that when expanded said tubular member deforms said at least one spring ring by forcing it against said at least one restricting surface thereby reducing the inner diameter and increasing the outer diameter of said at least one spring ring to cause the respective inner and outer edges thereof to tightly engage the said internal and external peripheral surfaces, respectively, of the elements to be joined to increase the holding and sealing properties of the finished joint.

2. A joint as claimed in claim 1 wherein said at least one holding and sealing member comprises at least two spring rings the frusto-conical surfaces of which extend oppositely with respect to each other so that the planes of said surfaces intersect to form acute angles adjacent respective inner and outer edges of adjacent spring rings.

3. A joint for two elements wherein one element to be joined has an internal peripheral surface disposed in surrounding spaced relationship with respect to the external peripheral surface of the second element, comprising:
   at least one substantially ring-shaped expandable tubular member disposed between the internal and external peripheral surfaces of the respective elements to be joined;
   an explosive charge enclosed within said tubular member to expand said tubular member when ignited into contacting engagement with said internal and external peripheral surfaces;

at least one restricting surface in the space between said internal and external peripheral surfaces to restrict expansion of said tubular member; and outwardly directed wedge-shaped sealing members arranged within said tubular member to force portions thereof into contacting engagement with at least one of said peripheral surfaces of the elements to be joined when said tubular member is in the expanded position to prevent deflection of the expanded tubular member to increase the holding and sealing properties of the finished joint.

4. A joint for two elements wherein one element to be joined has an internal peripheral surface disposed in surrounding spaced relationship with respect to the external peripheral surface of the second element, comprising:

at least one substantially ring-shaped expandable tubular member disposed between the internal and external peripheral surfaces of the respective elements to be joined;

an explosive charge enclosed within said tubular member to expand said tubular member when ignited into contacting engagement with said internal and external peripheral surfaces;

at least one restricting surface in the space between said internal and external peripheral surfaces to restrict expansion of said tubular member; and at least one supporting ring enclosed within said tubular member forming an integral part thereof adapted to force the adjacent portion of the tubular member into contacting engagement with portions of said internal and external peripheral surfaces of the elements to be joined when said tubular member is in the expanded position to prevent deflection of the expanded tubular member to increase the holding and sealing properties of the finished joint.

5. A joint for two elements wherein one element to be joined has an internal peripheral surface disposed in surrounding spaced relationship with respect to the external peripheral surface of the second element, comprising:

at least one substantially ring-shaped expandable tubular member disposed between the internal and external peripheral surfaces of the respective elements to be joined;

an explosive charge enclosed within said tubular member to expand said tubular member when ignited into contacting engagement with said internal and external peripheral surfaces;

at least one restricting surface in the space between said internal and external peripheral surfaces to restrict expansion of said tubular member; and at least one holding and sealing member disposed between said internal and external peripheral surfaces to cooperate with said at least one restricting surface when said tubular member is in the expanded position to prevent deflection thereof from the expanded position to increase the holding and sealing properties of the finished joint;

wherein said tubular member comprises a helically coiled member having the ends thereof sealed by a folding operation.

6. A joint for two elements wherein one element to be joined has an internal peripheral surface disposed in surrounding spaced relationship with respect to the external peripheral surface of the second element, comprising:

at least one substantially ring-shaped expandable tubular member disposed between the internal and external peripheral surfaces of the respective elements to be joined;

an explosive charge enclosed within said tubular member to expand said tubular member when ignited into contacting engagement with said internal and external peripheral surfaces;

at least one restricting surface in the space between said internal and external peripheral surfaces to restrict expansion of said tubular member; and at least one holding and sealing member disposed between said internal and external peripheral surfaces to cooperate with said at least one restricting surface when said tubular member is in the expanded position to prevent deflection thereof from the expanded position to increase the holding and sealing properties of the finished joint;

wherein said tubular member comprises a single coil member extending substantially in a single plane and having two free ends telescopically interengaged.

7. A joint for two elements wherein one element to be joined has an internal peripheral surface disposed in surrounding spaced relationship with respect to the external peripheral surface of the second element, comprising:

at least one substantially ring-shaped expandable tubular member disposed between the internal and external peripheral surfaces of the respective elements to be joined;

an explosive charge enclosed within said tubular member to expand said tubular member when ignited into contacting engagement with said internal and external peripheral surfaces;

igniter means operatively associated with said explosive charge to ignite said explosive charge;

at least one restricting surface in the space between said internal and external peripheral surfaces to restrict expansion of said tubular member; and at least one holding and sealing member disposed between said internal and external peripheral surfaces to cooperate with said at least one restricting surface when said tubular member is in the expanded position to prevent deflection thereof from the expanded position to increase the holding and sealing properties of the finished joint;

wherein said tubular member prior to expansion thereof has a plurality of longitudinally extending deformations to decrease the outer diameter and increase the inner diameter thereof and reduce the width thereof with respect to the dimensions of the tubular member in the expanded position.

* * * * *